United States Patent [19]

McEwen et al.

[11] Patent Number: 4,767,549

[45] Date of Patent: Aug. 30, 1988

[54] DISPERSANT COATED MINERAL FIBER IN A DRILLING FLUID

[75] Inventors: Terence D. McEwen, Evanston; John D. Hansen, Mundelein, both of Ill.

[73] Assignee: USG Interiors, Inc., Chicago, Ill.

[21] Appl. No.: 143,268

[22] Filed: Jan. 4, 1988

Related U.S. Application Data

[62] Division of Ser. No. 908,062, Sep. 16, 1986, abandoned.

[51] Int. Cl.$^4$ ................................................ C09K 3/00
[52] U.S. Cl. ................................... 252/8.514; 65/3.1; 252/8.512; 427/220
[58] Field of Search .......................... 65/3.1, 6, 14, 19; 427/220; 252/8.51, 8.512, 8.514, 8.515

[56] References Cited

U.S. PATENT DOCUMENTS

| | | | |
|---|---|---|---|
| 2,774,103 | 12/1956 | Graybeal | 65/15 |
| 3,343,933 | 9/1967 | Mullen et al. | 65/14 X |
| 3,723,311 | 3/1973 | Lammus et al. | 252/8.515 |
| 3,726,796 | 4/1973 | Schweiger | 252/8.515 |
| 4,626,289 | 12/1986 | Hsu | 65/3.1 X |

FOREIGN PATENT DOCUMENTS

| | | | |
|---|---|---|---|
| 0088146 | 5/1983 | Japan | 65/3.1 |
| 0088147 | 5/1983 | Japan | 65/3.1 |
| 0095628 | 6/1983 | Japan | 65/3.1 |
| 0050051 | 3/1984 | Japan | 65/3.1 |

OTHER PUBLICATIONS

Kirk & Othmer, "Encyclopedia of Chem. Tech", 3rd Ed. pp. 521–531, John Wiley & Sons.

Primary Examiner—Robert L. Lindsay
Attorney, Agent, or Firm—Robert M. Didrick; Robert H. Robinson

[57] ABSTRACT

An oil well drilling fluid containing mineral fibers which have been coated individually with a dispersant is better able to plug voids and fractures in the rock being drilled than those of the prior art because the mineral fibers are thoroughly dispersed. The fluid is substantially free of nodulated fibers. A dispersant such as a polyethoxylated quaternary ammonium salt is added to a stream of air which attenuates streams of molten slag into fibers. The fibers are uniformly coated with the dispersant and nodules thereof unravel easily when placed in a drilling fluid.

7 Claims, No Drawings

DISPERSANT COATED MINERAL FIBER IN A DRILLING FLUID

This is a divisional of co-pending application Ser. No. 908,062, filed on Sept. 16, 1986, now abandoned.

This invention relates to an oil well drilling fluid which bridges and plugs off voids and fractures in rock formations through which a drilling fluid may otherwise be lost. It relates more particularly to a drilling fluid containng loose discrete mineral fibers. Still more particularly, it relates to a method for treating mineral fibers so that a nodulated mass of said fibers will readily disperse as loosely matted fibers in a drilling fluid.

Mineral fibers made by the fiberization of molten blast furnace slag, siliceous rocks and the like have been used in the past in drilling fluids to plug up porous rocks but the poor dispersibility of the fiber in aqueous and oil-based fluids has discouraged their use. The use of wetting agents as surface treatments for the nodulated fibers has helped in some degree to help the fibers to sink into the fluid but they remain as clumps rather than being dispersed as loosely matted discrete fibers.

It is an object of this invention, therefore, to provide a dispersant treated mineral fiber which readily disperses in aqueous or oil based drilling fluids with minimal agitation to form a drilling fluid in which the mineral fibers are discrete as opposed to being nodulated and are loosely associated as in a spongy, suspended mat.

It is a related object of this invention to provide a mineral fiber filled drilling fluid which, because of the fibers are thoroughly dispersed and only loosely associated in the fluid, is better adapted to plug pores and fractures in oil well rock formations by bridging them with the fibers.

It is a related object of this invention to provide a drilling fluid comprising mineral fibers which have a substantially uniform coating of a dispersant, the individual fibers having been treated with the dispersant immediately after being formed from a molten slag.

It is a related object of this invention to provide a method for applying a dispersant to individual mineral fibers during the fiberization process.

These and other objects of this invention which will become apparent from the following description are achieved by treating the suface of the mineral fibers with a dispersant selected from the class consisting of alkoxylated fatty amines and an alkoxylated quaternary ammonium salt having the formula:

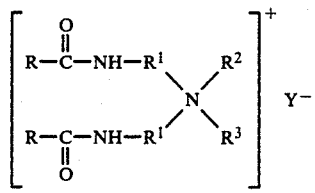

wherein R is an aliphatic radical, $R^1$ is an alkylenyl radical, $R^2$ is an alkyl radical, $R^3$ is a hydroxyalkyl radical, and Y is Cl or $R^4X$ in which $R^4$ is the same or different alkyl radical as $R^2$ and X is $SO_4$.

The alkoxylated fatty amine and the alkoxylated salt are obtained by reacting the amine or the salt with an alkylene oxide such as ethylene-or propylene oxide. The number of alkoxy groups which are added may be from 1 to about 20 or more.

The fatty amine may have from about 12 to about 24 carbon atoms and may be represented by a mixture such a tallowamine which comprises 16 and 18 carbon amines.

The aliphatic radical represented by R may be a straight-or branched chain hydrocarbyl radical and may be saturated or unsaturated. The number of carbon atoms in the radical may be from about 12 to about 24. Examples of this aliphatic radical include the hydrocarbyl moieties of carboxylic acids such as lauric, myristic, palmitic, stearic, oleic, and linoleic acids and mixtures thereof. In a particularly preferred quaternary ammonium salt for this invention, the aliphatic radicals represented by R are the hydrocarbyl moieties of the fatty acids found in tallow, i.e., stearic, palmitic and oleic acids.

$R^1$ may be an alkylenyl radical having from 2 to about 6 carbon atoms, exemplified by the ethylenyl, propylenyl, and hexylenyl radicals.

$R^2$ may have from 1 to about 4 carbon atoms and is exemplified by methyl, ethyl, propyl, and butyl radicals. It originates from the dialkyl sulfate or alkyl chloride with which the starting tertiary amine is reacted to produce the quaternary ammonium salt. If the dialkyl sulfate is a mixed sulfate such as methyl ethyl sulfate, $R^2$ and $R^4$ will be different, otherwise they will be the same. The reaction of an alkyl chloride with the tertiary amine will give a salt wherein Y is a chloride ion.

$R^3$ may have from 2 to about 4 carbon atoms and is exemplified by hydroxyethyl and hydroxypropyl radicals.

A preferred method for treating the mineral fiber with the dispersant is to meter it out as an aqueous solution through a nozzle mounted above the fiberizing air stream illustrated in U.S. Pat. No. 4,342,582, which is incorporated herein by reference. In that patent, the fiberizing air stream sweeps past the circumferential edge of a rotating cup over which streams of a molten slag are being ejected from the cup by centrifugal force. The impinging blast of air attenuates the streams of molten slag and cools them to form the individual mineral fibers. The addition of the dispersant to the air stream as the air emerges from the air ring surrounding the cup causes the individual fibers to be substantially uniformly coated with the dispersant before the fibers begin to knit together as tufts in the collection chamber.

As a result, even when nodulated, the fibers and are much more readily dispersed in water and in aqueous and oil based fluids such as those used in oil well drilling than when the dispersant is first added after the fibers have been nodulated. The grinding of untreated nodulated fibers so that more of the fibers may be coated with a dispersant results in the shortening of the fibers to such an extent that their usefulness in bridging voids is defeated.

To avoid decomposition of the dispersant, particularly in the case of the quaternary salt, in the harsh, hot conditions in the air fiberizing process wherein the molten slag is at a temperature greater than 2000° F., the dispersant is added as an aqueous solution containing up to about 50% by weight of the active ingredient. Preferably, the concentration is lower. A solution containing less than about 20% of the dispersant is preferred and from about 10% to about 15% is particularly preferred. When producing fiber at a rate of about 4 tons per hour, the dispersant solution is added to the air fiberization stream at a rate of from about 0.1 to about 1 gallon per minute. The solution may be added to the air stream through a nozzle projecting from a tube within the shaft on which the rotating cup is mounted. The apparatus is illustrated and described in the aforementioned U.S. Pat. No. 4,342,582, and is hereinafter referred to as the Porter apparatus.

The average diameter of the mineral fiber thus produced for use in the drilling fluid is on the order of about 5 microns and its aspect ratio is about 1000. Less than 12% of the fiber is retained on a 0.5 inch screen. The weight of dispersant retained on the fiber is from about 0.1% to about 1% by weight as determined by loss on ignition. High boiling solvents in which the dispersant is available commercially may also remain on the fibers without harm to their utility in this invention.

The drilling fluid contains from about 0.005 pound to about 1 pound of the dispersant coated fiber per gallon. The fluid may be water, brine, or muds comprised of aqueous or oil-based dispersions of clays, polymers, and other commonly used additives. The dispersant coated fibers are dropped into the water or diesel oil contained in a tank or an earthern pit at the well site and they promptly disperse with minimal agitation so that the fluid is ready for use with little delay.

The following examples illustrate the invention in more detail. Parts are by weight unless otherwise noted.

EXAMPLE I

Fiberizing air is blown at 7000 to 8000 cubic feet per minute through an air ring mounted as close as possible to the rotating cup of the Porter apparatus. A melt of blast furnace slag, silica rock, and ceramic tile scraps is directed into the rotating cup at a rate of about 4 tons per hour. A 12% aqueous solution of dispersant, made by dilution of a polyethoxylated quaternary ammonium salt sold by the Sherex Chemical Co. under the trademark VARISOFT 222-HG is added at a rate of about 0.6 to 0.7 gallons per minute to the air as it exits from the air ring. The rate of addition of the active dispersant is about 0.4 pound per minute. The VARISOFT 222-HG product is a 75% by weight solution in hexylene glycol of the polyethoxylated methyl sulfate salt of the diamide made from tallow acids and hydroxyethyl-diethylene-triamine. The weight loss on ignition of the fibers collected was checked periodically to determine the amount of dispersant retained. It ranged from 0.3% to 0.8% and the average was 0.56%. After one pass of the loosely knit fiberss through a granulator, 8% of the nodules remained on a 0.5 inch screen.

EXAMPLE 2

Mineral fibers made and treated according to the procedure of Example 1 were added to a drilling mud comprising water and clay at a ratio of 0.25 pound per 42 gallon barrel of mud and the resulting mud was used in the drilling of an oil well. The amount of mud that was lost through voids in the rock being drilled was decreased significantly as compared to the loss before the fibers were added. Similar success was had when the fibers were added to drilling fluids at ratios of 1 pound, 2 pounds, and 35 pounds per 42 gallons.

EXAMPLE 3

The general procedure of Example 1 was repeated except that a polyethoxylated tallowamine was substituted for the quaternary ammonium salt. Less than 12% by weight of the nodulated fibers remained on a 0.5 inch screen. The nodules broke apart easily when dry and when dropped into water and stirred gently. The dispersion was substantially free of nodulated fiber and the fibers were judged to be suitable for use in a drilling fluid of this invention.

Although specific embodiments of the invention have been described in the above examples, it will be apparent to those skilled in the art that other dispersants may be added to the fiberizing air stream so that individual mineral fibers are coated with the dispersant and would be useful in an oil well drilling fluid.

The subject matter claimed is:

1. An oil well drilling fluid comprising a mineral fiber having its surface coated by a dispersant selected from the class consisting of an alkoxylated fatty amine and an alkoxylated quaternary ammonium salt having the formula:

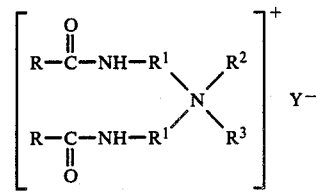

wherein R is an aliphatic radical, R' is an alkylenyl radical, $R^2$ is an alykl radical, $R^3$ is a hydroxyalkyl radical, and Y is Cl or $R^4X$ in which $R^4$ is the same or different alkyl radical as $R^2$ and X is $SO_4$.

2. The drilling fluid of claim 1 wherein the dispersant is an alkoxylated quaternary ammonium salt wherein Y is $R^2X$.

3. The drilling fluid of claim 1 wherein the dispersant is a poly-(ethoxylated) quaternary ammonium salt.

4. The drilling fluid of claim 2 wherein the alkoxylated salt is a ply-(ethoxylated) salt.

5. The drilling fluid of claim 1 characterized further in that it is substantially free of nodulated mineral fiber.

6. The drilling fluid of claim 1 wherein the amount of mineral fiber is from about 0.005 pound to about 1 pound per gallon.

7. The drilling fluid of claim 1 wherein the amount of dispersant on the fiber is from about 0.1% to about 1% by weight.

* * * * *